United States Patent
Cardoso (10) Patent No.: US 9,570,639 B2
(45) Date of Patent: Feb. 14, 2017

(54) SYSTEM WITH GRADUAL CHANGE OF LIGHT DISTRIBUTION OR SHADOW DISTRIBUTION ON A SURFACE COMPRISING LIGHT ELEMENTS OR PHOTOVOLTAIC ELEMENTS

(76) Inventor: Paulo Alexandre Teixeira E. Silva Cardoso, Lisbon (PT)

(*) Notice: Subject to any disclaimer, the term of this patent is extended or adjusted under 35 U.S.C. 154(b) by 325 days.

(21) Appl. No.: 14/232,233

(22) PCT Filed: Jul. 12, 2012

(86) PCT No.: PCT/PT2012/000028
§ 371 (c)(1),
(2), (4) Date: Mar. 26, 2014

(87) PCT Pub. No.: WO2013/009199
PCT Pub. Date: Jan. 17, 2013

(65) Prior Publication Data
US 2014/0233127 A1   Aug. 21, 2014

(30) Foreign Application Priority Data
Jul. 12, 2011   (PT) .......................... 105813

(51) Int. Cl.
*H02S 20/00*   (2014.01)
*H01L 31/042*   (2014.01)
(Continued)

(52) U.S. Cl.
CPC ............. *H01L 31/042* (2013.01); *E01C 17/00* (2013.01); *F21S 8/086* (2013.01); *H02S 10/00* (2013.01);
(Continued)

(58) Field of Classification Search
CPC .......... H02S 20/00; H02S 20/10; H02S 20/20; H02S 20/21; H01L 31/042; E01C 17/00; F21S 8/086; F21W 2131/103; Y02E 10/50
(Continued)

(56) References Cited

U.S. PATENT DOCUMENTS 5,107,637 A * 4/1992 Robbins ................ E04H 1/1211
                                                         136/291
5,911,500 A * 6/1999 Barnett .............. G01N 21/8806
                                                         362/145

(Continued)

FOREIGN PATENT DOCUMENTS

DE         44 31 750 A1     3/1996
DE    10 2005 007136 A1     3/2006
(Continued)

OTHER PUBLICATIONS

International Search Report, Oct. 22, 2012, two pages, European Patent Office.

*Primary Examiner* — Laura Tso
(74) *Attorney, Agent, or Firm* — Fulwider Patton LLP (57) ABSTRACT

The present invention refers to a system including light processing elements, arranged in a respective installation area and combined with a respective construction, at least partially above and/or next to an occupational or passage space, whereby said light processing elements or respective constructions produce a general light distribution over said occupational or passage space, that is more favorable in terms of visual performance and comfort, and that may assist and adjust to activities requiring different levels thereof. The inventive system is used for energy and/or information conversion and distribution, as part of one construction or clusters of constructions, for example disposed along traffic ways.

9 Claims, 6 Drawing Sheets (51) Int. Cl.
   *F21S 8/08* (2006.01)
   *H01L 31/04* (2014.01)
   *E01C 17/00* (2006.01)
   *F21W 131/103* (2006.01)

(52) U.S. Cl.
   CPC ......... *F21W 2131/103* (2013.01); *Y02E 10/50* (2013.01)

(58) Field of Classification Search
   USPC .............................. 362/152, 153, 145, 192
   See application file for complete search history.

(56) References Cited

U.S. PATENT DOCUMENTS

| | | | |
|---|---|---|---|
| 6,231,206 B1 * | 5/2001 | Hervey | G02B 6/0008 362/153 |
| 7,021,786 B1 * | 4/2006 | Sandor, Sr. | E04F 15/08 362/145 |
| 7,976,180 B1 * | 7/2011 | Haun | F21S 8/086 362/153.1 |

FOREIGN PATENT DOCUMENTS

| | | |
|---|---|---|
| EP | 2 233 826 A1 | 9/2010 |
| GB | 515418 A | 12/1939 |
| JP | 4 092395 A | 3/1992 |

\* cited by examiner

SYSTEM WITH GRADUAL CHANGE OF
LIGHT DISTRIBUTION OR SHADOW
DISTRIBUTION ON A SURFACE
COMPRISING LIGHT ELEMENTS OR
PHOTOVOLTAIC ELEMENTS

CROSS-REFERENCES TO RELATED
APPLICATIONS

This application claims priority from PCT/PT2012/000028, filed Jul. 12, 2012 incorporated by reference in its entirety.

FIELD OF THE INVENTION

The present invention relates to a system presenting light processing elements in a respective reference installation area, and to a construction presenting said system and disposed at least partially above and/or next to spaces of occasional or regular human occupation or transit, and producing a comfortable and efficient general light distribution thereupon.

Illustrative uses of said systems include distributed energy generation and their combination with superstructures along traffic ways and other occupational or passage spaces.

BACKGROUND

There is an increasing number of designs of constructions including daylight processing means, such as solar energy panels, disposed at an elevation at least partially above or next to areas frequently and/or occasionally occupied by humans, for example while relaxing or working in it, and/or traversed by humans, for example while walking or driving along it, and producing a given light distribution thereupon. Said light distribution has a substantial impact upon human comfort and performance, in particular upon visual comfort and behavioral responsiveness. In general, the goal of the design of such light distribution may vary from providing a general pleasant feeling in areas of short occupation to reducing the risks of attention distress and visual responsiveness attenuation in areas requiring high levels of vision accuracy and overall attention to varying circumstances and factors. Moreover, the installation of said superstructures at least partly above the occupation! passage area represents a problem in view of providing favorable light distribution and in particular avoiding acuity shadow light patterns along extensive lengths, especially during periods of significant luminance outside of said superstructures, in combination with constructions of minimal complexity and resistant to adverse weather conditions. This is particularly relevant in the case of superstructures disposed along traffic ways.

The U.S. Pat. No. 5,478,407 discloses an assembly for shading of space that can be negotiated on foot, whereby at least some of the elements present a different orientation from the others so as to maximize the incident solar irradiation at different times of a day. The WO 2010/0064942 and the WO 2012/074423 disclose superstructures carrying solar energy, and eventually information systems, substantially above and along traffic ways. None of these documents consider or propose a solution to the issue of the light distribution resulting upon a neighboring occupational space.

It is not yet known, in the prior art of a solution to the problem posed by distributions of light processing elements in the vicinity of occupational/passage areas, particularly in view of visual comfort and performance, and the possibility of adjusting a resulting light distribution according to varying daylight conditions or other operational parameters.

SUMMARY OF THE INVENTION

The primary goal of the present invention is to provide a system comprising light processing elements, at least including light energy conversion elements, such as solar energy elements, or light wavelength emission elements, such as lamps or infrared devices, that provides enhanced visual conditions, in particular visual comfort and performance conditions, as required by activities in neighboring spaces.

The aforementioned goal is attained according to a first inventive aspect by a system comprising light processing elements arranged in a reference installation area and combined with a respective construction, disposed at least partially next to and/or enclosing a respective reference occupational/passage space, in that said light processing elements and/or respective constructions are differently executed and/or distributed and/or operated in such a way so as to produce a general light distribution including a substantially gradual distribution of light intensity and preferentially a substantially irregular distribution of shadow, preferentially in a diverse and/or granular and/or blurred shadow-light or dark-clear pattern, along at least a substantial part of said reference space or overall length thereof. In this context, "diverse" means inclusion of different tones or colors, "granular" means in great number and of relatively small size, and "blurred" means predominantly non-abrupt transitions of tone or color, as perceived at least on a horizontal plane of said reference space. In particular, said system produces a general natural light distribution that does not include relatively big areas of abrupt variation of light intensity, at least when compared to adjacent areas and/or to prevailing outside light intensity, eventually leading to glare, and/or of substantially acuity shadow light patterns, eventually leading to visual fatigue and misperception, and/or relatively big extensions, of substantially similar and/or continuous shadow and/or of substantially sharp shadow-light transition and/or of substantial variations of its overall dimension and/or pattern and/or spatial distribution, at least during the period of solar radiation most directly incident thereupon, eventually leading to visual fatigue and/or visual contrast attenuation. In this context, "acuity patterns" are considered to include high-contrast stripes, checkerboard and highly regimented geometric, graphic and dot patterns, and similar substantially geometric patterns including those potentially inducing mental stresses.

According to another inventive aspect, said light processing elements and/or respective constructions are operated in such a way so as to adjust said general light distribution to prevailing conditions, including light intensity outside and/or operational parameters.

In a preferred embodiment, light intensity values should vary by less than a given amount at least in relatively big partial areas, or along relatively big partial lengths of a reference space. Moreover, light intensity levels should not decrease under a certain threshold relative to light intensity levels prevailing outside. In a particularly advantageous embodiment, light intensity levels are adjusted so as to vary gradually in relation to said outside light intensity levels, in particular in certain areas of transition when entering and leaving a respective reference space.

Another goal of the present invention is to advance solutions of executing, distributing or operating light processing elements to produce certain, specifically intended distributions of light intensity and/or of shadow best supporting certain respective activities or as indications of local conditions. In a preferred embodiment, the distribution of light intensity may be adjusted so as to vary along certain partial areas, such as certain spots or parallel lanes, thereby providing specific lighting conditions and/or conveying the presence of particular activities or circulation conditions.

Another goal of the present invention is to advance a system using the least and simplest options in terms of different materials, formats, dimensions and relative dispositions, so as to attain a general light distribution according to the present invention. This is particularly relevant because solar energy elements are usually provided in a single format and size. In a preferred embodiment, this goal is achieved by similar light processing elements distributed at intervals apart that vary along only one direction of said reference installation area. In another embodiment, there is provided a system in which one partial area of the installation area presents a non-symmetrical distribution of similar light processing elements and/or respective constructions, and whereby said partial area is used again in other locations but in another relative orientation, so as to modularly produce said general light distribution. In another embodiment, there is even provided a regular distribution of substantially similar presenting different light processing elements, but light interaction properties and/or carrying out different processes, such as light energy conversion (including processes), photovoltaic, photochromic and photoelectric light distribution (including partial transmission or reflection in different colors), and light wavelength emission (including visible light, infrared and microwaves), so that they contribute differently to the resulting light distribution produced upon a respective space. In a preferred embodiment, light distributing elements, that change at least one parameter of a visible light beam incident thereupon, such as in a semitransparent colored material, are disposed next to light processing elements of substantially different light transmission, such as opaque photovoltaic elements. In a particularly preferred embodiment, said light processing elements or a respective construction are provided in a single element of wide-area format presenting irregular light-through or light-blocking forms, for example in the form of a tensile membrane or of a mesh of rigid pines. In another preferred embodiment, a system according to the invention includes light processing elements of substantially annular format, arranged in a, at least partially superimposed and/or concentric relative arrangement, preferentially allowing substantial vision through the installation area.

Another goal of the present invention is to provide a system that adjusts, preferentially automatically, to varying conditions and/or events. In a preferred embodiment, at least some of said light processing elements are operated according to place and/or time varying conditions, for example relating to light conditions outside of said reference space, or to the use of said space. In another embodiment, the possibility of using light processing elements, such as photochromic or photoelectric elements, and/or light wavelength emitting elements, such as visible light, infrared or microwave devices, allows to provide for particular light conditions or information to users according to varying operational parameters.

It is a further goal of the present invention to provide a construction presenting a system according to the invention that maximizes operational efficiency of said light processing elements, requires minimal construction volume, maximum construction simplicity and is resistant to adverse weather conditions. This is particularly relevant in the case of superstructures with said system disposed at a height.

The present invention further discloses uses of a system and construction according to the invention, including as an energy and/or information generation and distribution system, including being used as at least one display of patterns, signs, symbols or messages at least towards said reference space.

The present invention shall be explained henceforth in more detail by reference to illustrative embodiments thereof, schematically represented in the drawings. The Figures show:

DETAILED DESCRIPTION OF THE PREFERRED EMBODIMENTS

In all Figures, shaded areas represent light processing elements (1a, . . . )—at least one of which is a light energy converting (2a, . . . ) or light emitting element (3a, . . . ) arranged in an installation area (4a, . . . , 4) represented in dashed lines, and combined with a respective construction (5a, . . . i 5). When said constructions (5a, . . . ) are disposed directly next or relatively close to each other, a single installation area (4) and a respective overall reference space (6) are considered—represented in dotted lines. Said reference space (6a, . . . i 6) basically corresponds to that being abridged by a general light distribution resulting from a respective installation area (4a, . . . i 4).

Figure 1A:
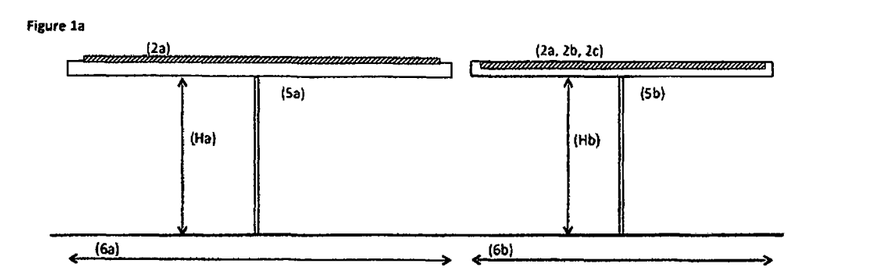
FIGS. 1a-1b: schematic representations of conventional distributions of light processing elements.
Figure 1B:
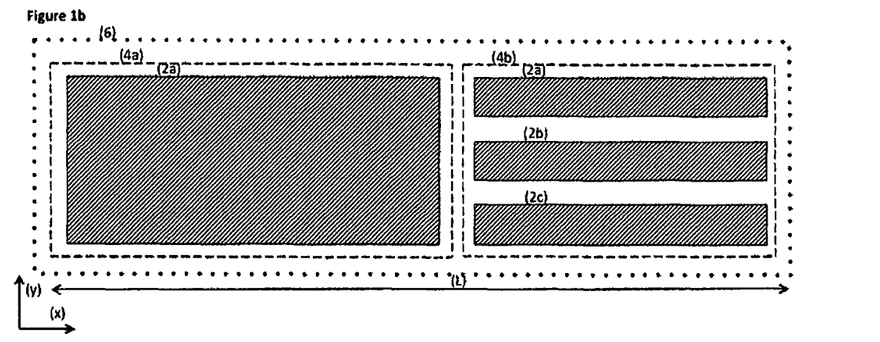

FIGS. 1 to 3 are illustrations of conventional cases. FIG. 1a is a side view of two superstructures (5a, 5b), disposed relatively close to each other, and FIG. 1b is a respective plan view. Said superstructures (5a, 5b) thereby present solar energy means—one (2a) in one case (5a) and three (2a, 2b, 2c) in the other (5b)—in each case defining a● respective installation area (4a, 4b) disposed at a height (Ha, Hb) above a respective occupation/passage area (6a, 6b), for example a urban park or a road, thereby defining an overall reference space (6) with a relevant length (L) along one direct; ion (x) thereof. The first superstructure (5a) presents one light energy conversion element (2a) in a substantially continuous extension therefore projecting a continuous and uniform shadow extending along most of a respective reference space (6a) and leading to a substantial reduction of light intensity levels thereupon when compared to outside. The second superstructure (5b) presents three substantially similar light energy conversion elements (2a, 2b, 2c) distributed in a substantially regular pattern over the installation area (4b), and therefore projecting a corresponding shadow pattern. Albeit this configuration might lead to a smaller reduction of light intensity levels along said reference space (6b), it is further a regular pattern that would become a source of visual discomfort.

Figure 2A:
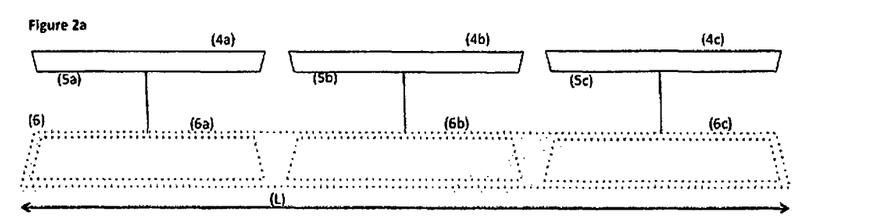
FIGS. 2a-2b: schematic representations of conventional distributions of light processing elements provided in a plurality constructions.
Figure 2B:
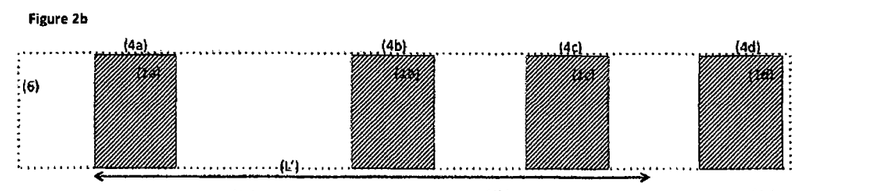

FIG. 2a illustrates the case of a plurality of light processing elements in a plurality of constructions (Sa, . . . ) installed successively along a predominant direction, such as for example along an at least partially above of a roadway. In a conventional disposition of solar energy means in respective installation areas (4a, . . . ), it would result in a succession of intense light/dark shadow areas, eventually with substantial variations of light intensity along a respective base area (6a, . . . ). This configuration affects the visual comfort of drivers, eventually leading to hazardous glare situations, enhanced fatigue and visual impairments. This is illustrated in FIG. 2b where a top view of two successions of light processing elements in respective installation areas (4a, . . . ) illustrates cases of regular shadow patterns repeating along a given direction (x), thereby eventually leading to visual fatigue, after a given critical length (L'). In the case depicted above in FIG. 2b, substantial variations of light intensity might lead to a sort of stroboscopic effect, and associated safety risks for drivers. The drawing below, illustrates a case with no substantial variations of light intensity, patterns, but in substantially regular so-called acuity visual light distribution patterns, again eventually leading to visual fatigue after a given critical 'length (L'). In fact, the eyes of drivers would need to adjust to abrupt and substantial variations of luminance, such as when driving into a tunnel. As an extreme condition, an extensive length of superstructures with relatively short but relatively substantial variations of ambient luminance could lead to a sort of stroboscopic effect of substantial discomfort and even hazardous to upon drivers and passengers.

Figure 3A:
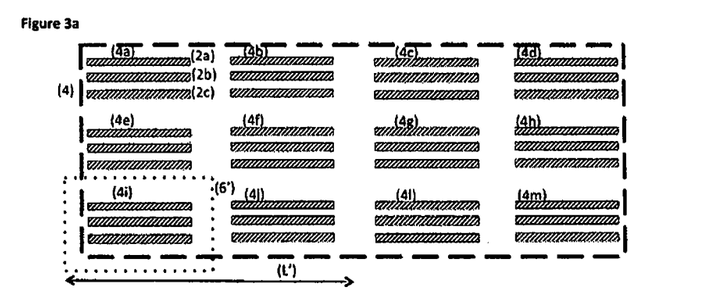
FIGS. 3a-3b: schematic representations of conventional distributions of groups of light processing elements provided in a common construction.
Figure 3B:
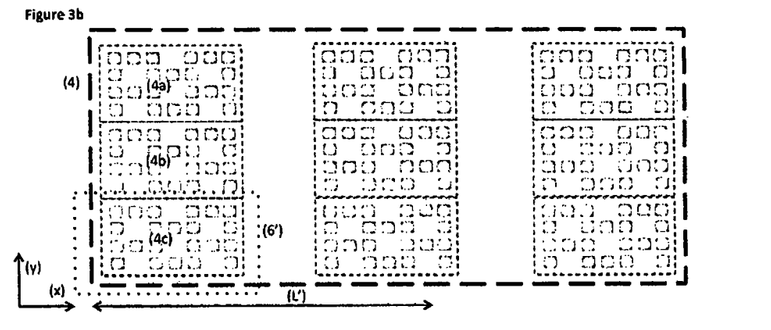

FIG. 3a shows a plan view of light processing elements (1a, . . . ) provided as similar photovoltaic elements (2a, . . . ); in a plurality of substantially similar installation areas (4a, . . . ), collectively forming a total installation area (4) represented by the thicker dashed line in a glazed construction (5) as it is known to be used for example in atria roofs and building facades. While reducing any substantial variations of light intensity when compared to outside luminance, it is readily apparent that this type of system also leads to a substantially acuity, monotonic and repetitive shadow pattern. An alternative distribution is illustrated in FIG. 3b, where said constructions (5a, . . . ) are clustered relatively close apart, in a common installation area (4). As it can be seen, even though a minor part—for example, (4a)—of such total area (4) presents a variable pattern distribution, this pattern is then repeated in a regular distribution in the rest of said total area (4). In both cases it is schematically represented a repeating pattern of light distribution being projected upon a critical part (6')—represented in dotted line—of a respective base area, and along a critical length (L') in a direction (x)—both of respectively relevant relative size within the total reference space (6).

FIGS. 4a-4d are plan views of a first embodiment of a system (10) according to the present invention, whereby there are provided substantially similar light processing elements (1a, . . . ) within a respective installation area (4a, . . . ).

Figure 4A:
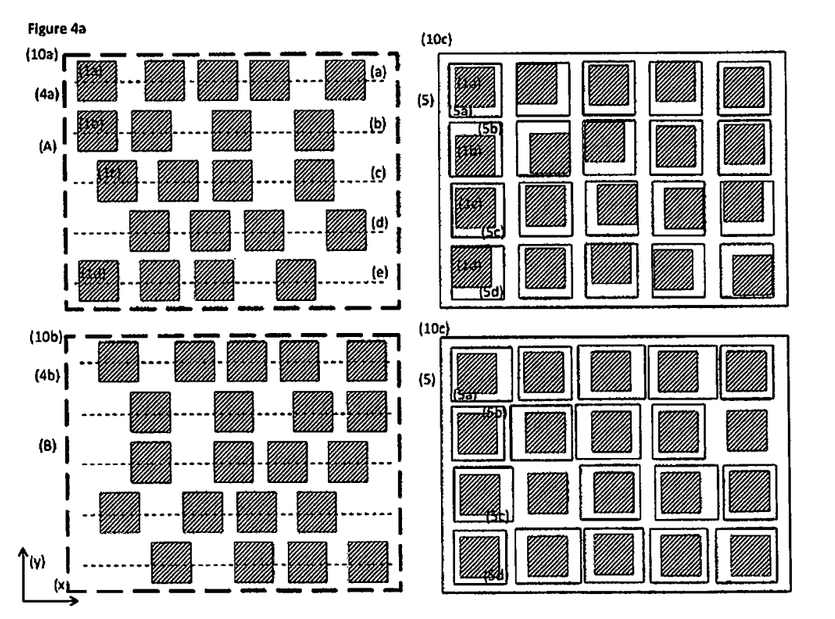
FIGS. 4a-4d: schematic representations of a first embodiment of a system (10) and construction (5) according to the invention.

FIG. 4a shows on the left-side an installation area (4a) presenting light processing elements (1a, . . . ) of substantially similar dimensions, format and material, in a distribution pattern (A) (see top drawing) along certain parallel lines (a, b, . . . ), at distances regular along (y) but varying along (x). Because this particular distribution is not symmetrical, it may be placed in the same or in a rotated position (B) (see bottom drawing) elsewhere within a given reference installation area (4). On the right-side there is a construction (S) presenting a plurality of light processing elements (1a, . . . , ) all further of similar format and dimensions. In one embodiment (see top drawing) it is the relative position of the light processing elements that varies within respective constructions (Sa, ", ), provided in the form of openings in a given material, whereas in another embodiment (see bottom drawing) it is the relative size and distribution of the constructions (Sa, . . . , ) that varies.

Figure 4B:
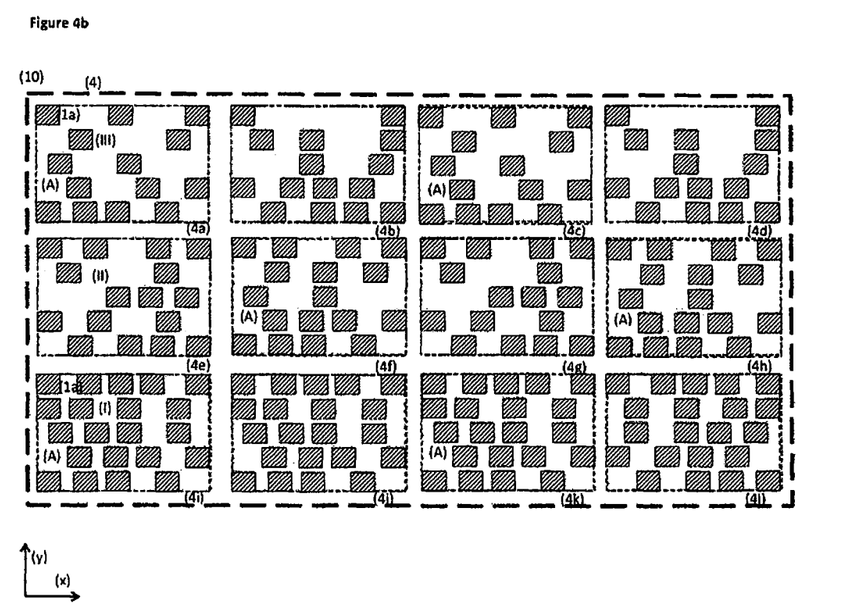

FIG. 4b shows a system (10) including a plurality of partial installation areas {4a, ",} disposed in relative proximity to each other and thus defining a total reference installation area (4). Moreover, in this case, besides of said two patterns (A, B), the pattern density of said light processing elements (1a, . . . ) is adjusted to vary along three sections (I, II, III) extending along a given direction (x).

Figure 4C:
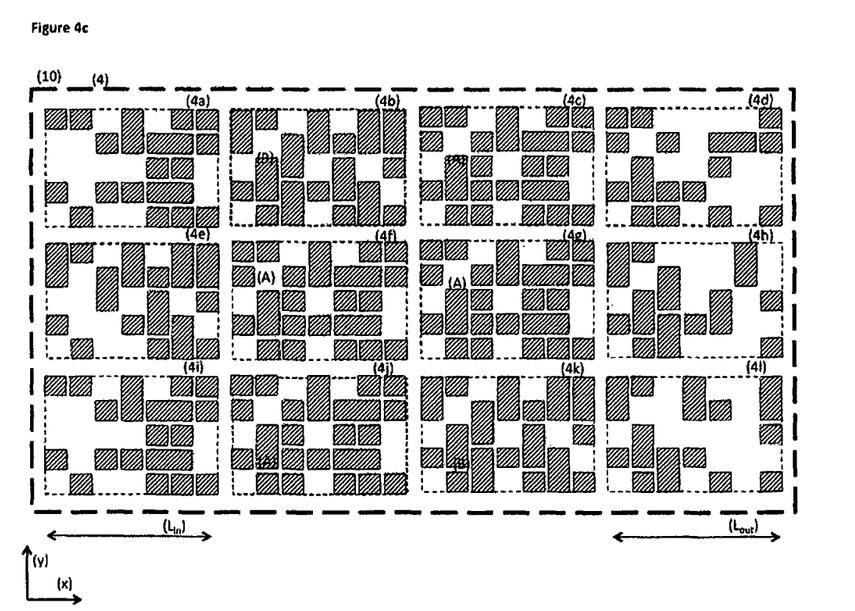

FIG. 4c represents a system (10) further using two modular dispositions (A, B), this time of elements of similar format and two different dimensions, disposed for example along a traffic way—whereby traffic circulates along (x). As illustrated, a selected, substantially irregular distribution of the two dimensions of light processing elements (1a, . . . ) and certain "blank" areas, allow attaining a distribution of light according to the invention. Moreover, in this case the "pattern density" of light processing elements (1a, . . . ) in the installation area (4a), is selected so as to gradually adjust said light intensity variation along a given direction (x), thereby gradually reducing light intensity along an ingoing length ($L_{in}$), and gradually increasing it again along an outgoing length ($L_{out}$). The actual rate of variation of light intensity along (x) is preferentially to be selected as a function of the total length (L) of the system (10) and traffic related parameters, such as location, road typology and circulation speed.

Figure 4D:
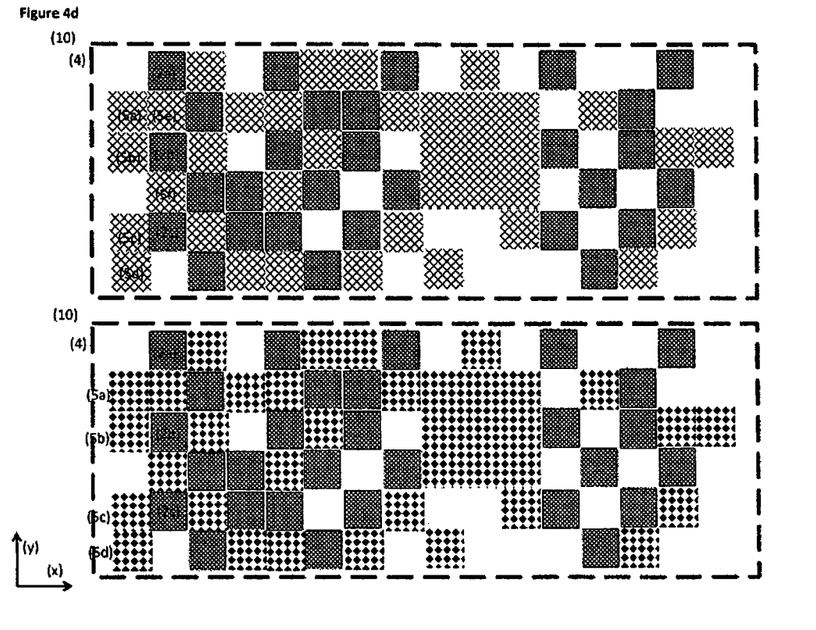

FIG. 4d shows a system (10) presenting a construction (5a) in the form of a mesh or web, whereby the disposition of the web wires and resulting reduced relative size of the interspaces, in this case in the form of diamonds, produces a granular shadow pattern and respective light diffraction (top drawing). Advantageously, said mesh constructions may change their format and resulting shadow density (bottom drawing).

FIGS. 5a-5d are plan views of a second preferred embodiment of a system (10) according to the present invention, whereby its installation area (4a, . . . ) presents light energy converting elements (2a, . . . ) of one format and dimension, in a regular distribution, together with light distributing elements (7a, . . . )—represented in dotted areas—provided in irregular format and/or distribution relative to said light energy converting elements (2a, . . . ).

Figure 5A:
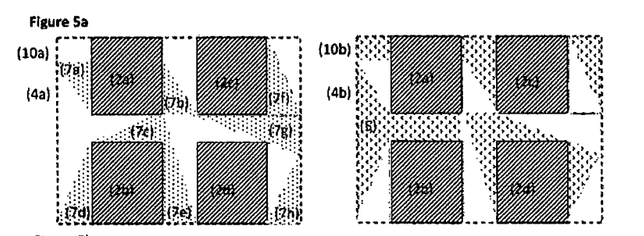
FIGS. 5a-5c: schematic representations of a second embodiment of a system (10) and construction (5) according to the invention.

FIG. 5a shows on the left-side an installation area (4a) with four similar light energy converting elements (2a, . . . ), in a substantially regular distribution, and a plurality of semi-transparent light distribution elements (7a, . . . ) of various shapes and dimensions, arranged in a substantially irregular fashion, next to said light energy converting elements (2a, . . . ). Alternatively, the installation area (4a) on the right-side is combined with one construction (S) presenting irregular openings and disposed underneath said light energy converting elements (2a, . . . ). This construction (5) may be designed as a substantially flat and continuous element, preferentially presenting a different transparency as the light energy converting elements (2a, . . . ), or as a plurality of thin non-rigid elements, for example a irregular mesh of wires, either planar or not, providing for light interference and a granular blurring of a resulting shadow pattern.

Figure 5B:
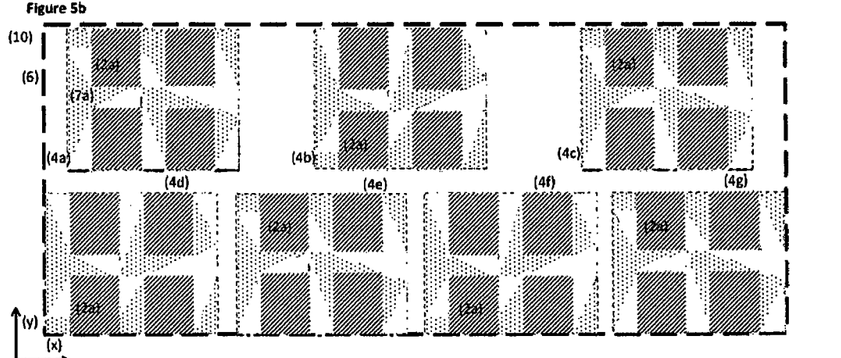

FIG. 5b illustrates another application of a system (10) where the installation areas (4a, . . . ) are disposed along two rows at a relatively reduced distance apart, thus resulting in a light distribution upon a substantially continuous reference space (6).

Figure 5C:
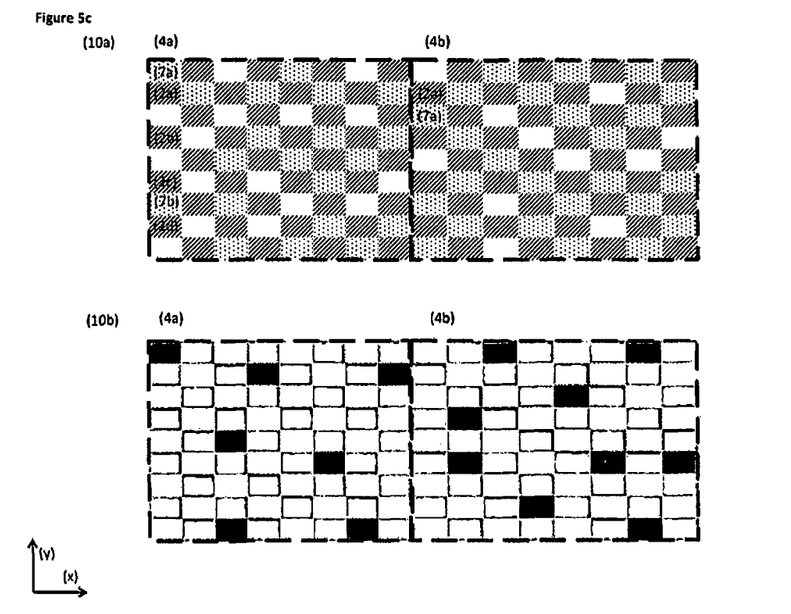

FIG. 5c shows systems (10a, 10b) according to the invention whereby both the respective installation areas (4a, 4b) present a regular distribution of light energy converting elements (2a, . . . ) of similar sizes and formats, together with an irregular distribution of light distribution elements (7a, . . . ) and blank-areas. The one (10b) on the bottom presents light distribution elements (7a) with two different degrees of transparency and/or color thereby producing two different light intensity levels and respective density patterns in relation to the overall installation area (4a, . . . ; 4).

In a preferred embodiment, at least some of the light processing elements (1a, . . . ) are actuated, preferentially automatically, by means of detecting variations of outside light conditions so as to vary the light intensity levels, eventually also the shadow patterns and densities, along a respective base area (6).

FIGS. 6a-6e illustrate another preferred embodiment of a system (10) according to the invention.

Figure 6A:
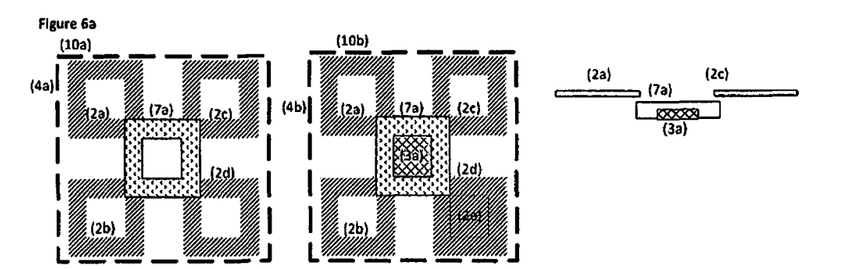
FIGS. 6a-6e: schematic representations of a third embodiment of a system (10) and construction (5) according to the invention.
Figure 6B:
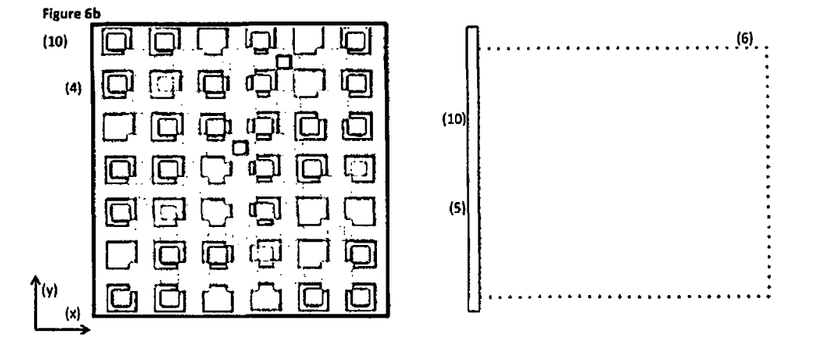
Figure 6C:
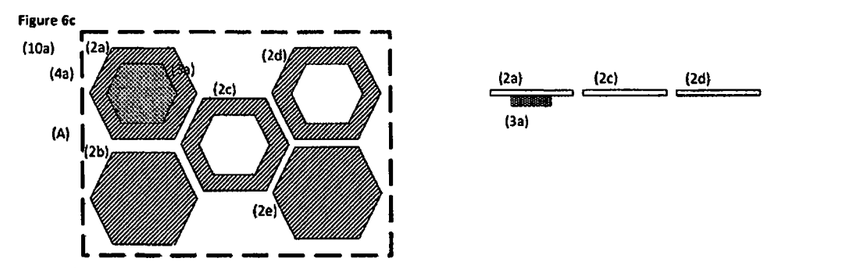
Figure 6D:
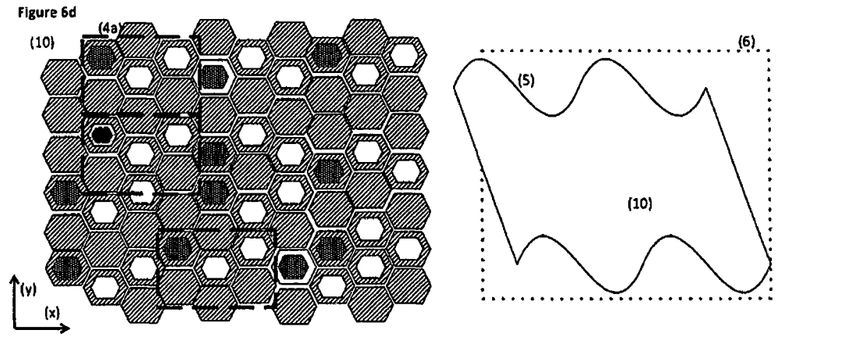
Figure 6E:
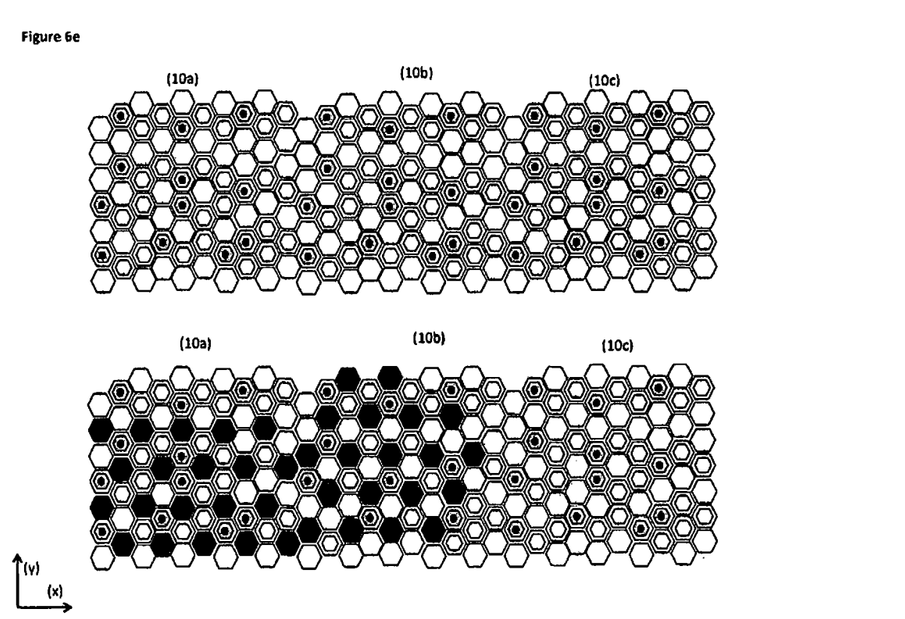

FIG. 6a shows a plan view of two installation areas (4a, 4b) and a front view of the second on the right, including light energy converting elements (2a, . . . ) and light emitting elements (3a, . . . ), all thereby presenting a substantially similar annular format, in this case of opensquare configuration. The system (10b) on the right differs in that it includes a light energy converting element (2e) at the centre of another (2d) f and a light emitting element (3a) at the center of a light distribution element (7a). The result of combining such partial installation areas (4a, 4b) in a wider system (10) is illustrated on the left side of FIG. 6b. This could be, for example, the case of the roof or curtain façade of a building, as schematically illustrated on the top view on the right side. FIG. 6c shows another embodiment of a partial installation area (4a) in top plan view on the left side and in front view on the right side. FIG. 6d represents the expansion of such installation area (4a) to a wider reference installation area (4), not necessarily of regular layout (schematically represented by a top view on the right side) disposed for example above of a respective reference space (6). FIG. 6e shows plan views in two successive moments (previous one in the top drawing and a next one in the bottom one) of part of a system (10) according to the invention whereby the light processing elements are operated according to varying light intensity or use related conditions, and eventually only in certain partial areas thereof, thereby producing a general light distribution according to the invention. As illustrative application possibilities, some of said light processing elements could be photochromic thereby adjusting to, for example, varying daylight conditions, or could be photoelectric and, for example, sense the presence of a person or passage of a vehicle, or could emit light in certain locations so as to compensate for variations of ambient light, or could emit microwaves and, for example, transfer data according to the needs of users in a respective location. In preferred embodiments, the relative dimension and distribution of blank spaces or semi-transparent elements allows a certain degree of vision through the installation area. In preferred embodiments, the dimension and distribution of light emitting elements allows forming visual signs, such as for example alphanumeric signs and/or images. In preferred embodiments, said system and constructions are perceived as a single entity, at least by people moving at a usual speed along a given direction (x) of a respective reference space.

I claim:

1. A system for managing light and shadow on a transportation path having a direction of travel, comprising:
    a series of elevated platforms positioned along the transportation path such that ambient light passing through portions of the platforms are cast upon the transportation path, the elevated platforms comprising opaque photovoltaic cells and designated light-transmissive elements; and
    whereby an arrangement of the photovoltaic cells and the designated light-transmissive elements on the elevated platforms creates a non-repeating pattern of light cast on the transportation path for a given elevated platform and for successive elevated platforms.

2. The system for managing light and shadow of claim 1, wherein the designated light-transmissive elements include at least some areas having a wire mesh.

3. The system for managing light and shadow of claim 1, wherein the designated light-transmissive elements include varying transmitted light intensities.

4. The system for managing light and shadow of claim 1, wherein the designated light-transmissive elements include elements that transmit a color of light that is different from a color of light in a designated light-transmissive element on the same elevated platform.

5. The system for managing light and shadow of claim 1, wherein the designated light-transmissive elements include photochromatic elements that adjust a light transmissivity based on a level of ambient light.

6. The system for managing light and shadow of claim 1, wherein the designated light-transmissive elements include photoelectric elements that senses movement and emits light at a location to compensate for variations in levels of ambient light.

7. The system for managing light and shadow of claim 1, wherein the elevated platforms include elements that emit microwaves.

8. The system for managing light and shadow of claim 7, wherein the elements that emit microwaves transfer data to users.

9. The system for managing light and shadow of claim 1, wherein the patterns of light can form alphanumeric characters that can be read by travelers on the transportation path.

* * * * *